United States Patent
Ye et al.

(10) Patent No.: US 9,134,775 B2
(45) Date of Patent: Sep. 15, 2015

(54) CONTROLLING A CURRENT DRAWN FROM AN ADAPTER BY A COMPUTER SYSTEM

(75) Inventors: Mao Ye, San Jose, CA (US); Bharatkumar K. Patel, San Jose, CA (US); Kisun Lee, Cupertino, CA (US); Manisha P. Pandya, Sunnyvale, CA (US); Shimon Elkayam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 13/477,705

(22) Filed: May 22, 2012

(65) Prior Publication Data

US 2013/0227319 A1    Aug. 29, 2013

Related U.S. Application Data

(60) Provisional application No. 61/603,863, filed on Feb. 27, 2012.

(51) Int. Cl.
*G06F 1/26* (2006.01)
*G06F 1/32* (2006.01)
*G06F 1/20* (2006.01)
*H02J 7/00* (2006.01)
*H02J 7/04* (2006.01)

(52) U.S. Cl.
CPC . *G06F 1/20* (2013.01); *G06F 1/263* (2013.01); *H02J 7/0055* (2013.01); *H02J 7/047* (2013.01); *H02J 2007/0039* (2013.01)

(58) Field of Classification Search
CPC .......... H02J 7/0055; H02J 7/02; H02J 7/047; H02J 2007/0039; G06F 1/263; G06F 1/20

USPC .......................................................... 713/320
See application file for complete search history.

(56) References Cited

U.S. PATENT DOCUMENTS

| | | | | |
|---|---|---|---|---|
| 5,677,944 | A  * | 10/1997 | Yamamoto et al. | 455/573 |
| 7,768,254 | B1 * | 8/2010 | Michael et al. | 324/142 |
| 2004/0049704 | A1 | 3/2004 | Yang et al. | |
| 2004/0199800 | A1 | 10/2004 | Yu | |
| 2007/0094521 | A1 * | 4/2007 | Brooks et al. | 713/300 |
| 2012/0060042 | A1 * | 3/2012 | Buhari et al. | 713/320 |
| 2012/0139500 | A1 * | 6/2012 | Ye et al. | 320/135 |
| 2013/0187446 | A1 * | 7/2013 | Ferrel et al. | 307/9.1 |

FOREIGN PATENT DOCUMENTS

EP    0503806 A2    9/1992

* cited by examiner

*Primary Examiner* — Jaweed A Abbaszadeh
*Assistant Examiner* — Xuxing Chen
(74) *Attorney, Agent, or Firm* — Blank Rome LLP

(57) ABSTRACT

The disclosed embodiments provide an apparatus that controls a current drawn from an adapter by a computer system. During operation, the apparatus senses the current drawn from the adapter using a first current sensor and a second current sensor, wherein a response time of the first current sensor is faster than a response time of the second current sensor. Then, when the current sensed using the first current sensor exceeds a predetermined high-current threshold, the apparatus limits the current drawn from the adapter to a first predetermined current limit. Additionally, when the current sensed using the second current sensor exceeds a predetermined thermal-limit current, the apparatus limits the current drawn from the adapter to the predetermined thermal-limit current.

22 Claims, 5 Drawing Sheets

CONTROLLING A CURRENT DRAWN FROM AN ADAPTER BY A COMPUTER SYSTEM

RELATED APPLICATION

This application claims priority to U.S. Provisional Application No. 61/603,863, entitled "Controlling a Current Drawn from an Adapter by a Computer System," by inventors Mao Ye, Bharatkumar K. Patel, Kisun Lee, Manisha P. Pandya and Shimon Elkayam, filed 27 Feb. 2012, the contents of which are incorporated herein by reference.

BACKGROUND

1. Field

The present embodiments relate to techniques for controlling a current drawn from an adapter. More specifically, the present embodiments relate to techniques for controlling a current drawn from an adapter by a computer system.

2. Related Art

Computer systems such as laptop computers are increasingly being manufactured with chips capable of substantially raising their power demands for short periods of time (e.g., by entering a "turbo" mode). When these chips enter a high power demand state, the required power may temporarily exceed the rated output power of the laptop adapter.

Typically, the current drawn from the adapter by the computer system is controlled with a current control loop that uses an integrator which, due to the accuracy required, often has a slow response time relative to the speed at which the chips can increase their current demands. Due to this relatively slow response time, the set point of the current control loop may have to be lowered from the rated output power of the adapter, preventing the computer system from using the full output capabilities of the adapter.

Furthermore, a faster current control loop such as one using a comparator typically cannot achieve the necessary accuracy to regulate the current drawn from the adapter to a desired steady-state value. Additionally, using a faster control loop to regulate the current from the adapter to the steady-state value may prevent the full current output capabilities of the adapter from being used.

Hence, use of computer systems may be facilitated by improvements related to controlling a current drawn from an adapter by a computer system.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
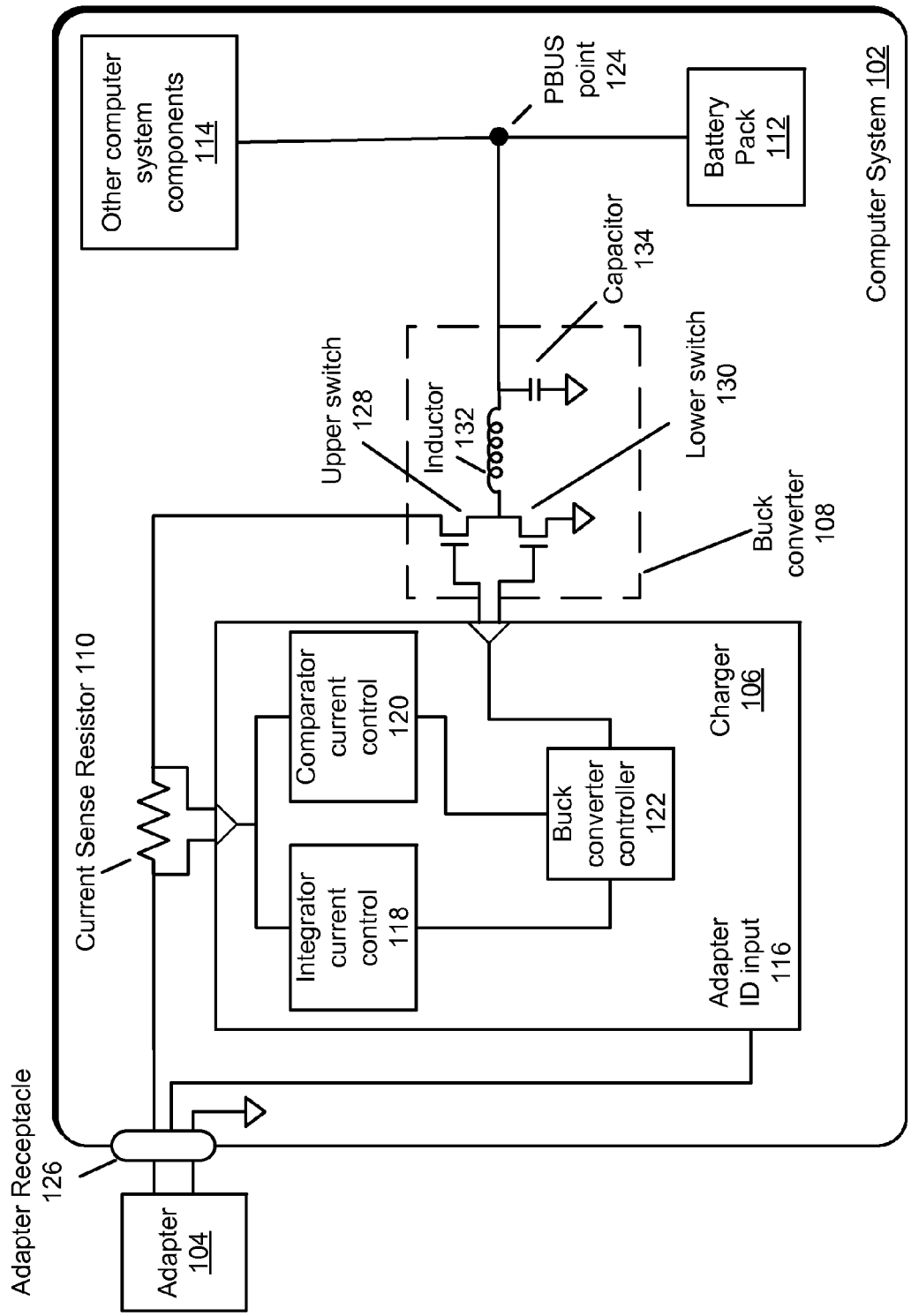
FIG. 1 shows a computer system in accordance with an embodiment.

FIG. 1 shows a computer system in accordance with an embodiment. Computer system 102 is coupled to adapter 104 and includes charger 106, buck converter 108, sense resistor 110, battery pack 112, other computer system components 114, and adapter receptacle 126. Charger 106 includes adapter ID input 116, integrator current control 118, comparator current control 120 and buck converter controller 122.

Computer system 102 can be any computer system that includes a charger and a battery, and receives electrical current from an adapter. Computer system 102 may include but is not limited to a laptop computer, a tablet computer, or a smartphone. Adapter 104 can be any electrical adapter that can provide electrical power to operate computer system 102. Adapter 104 can include but is not limited to any device that can convert household alternating current (AC) electricity into direct current (DC) electricity for use by computer system 102.

Charger 106 can be any combination of hardware and/or software implemented using analog and/or digital circuitry, and may include one or more processors, and volatile and nonvolatile memory. In some embodiments, charger 106 includes more than one chip or chip set, and in other embodiments charger 106 may operate in conjunction with a system management controller (SMC) that performs some of the functions of charger 106. In these embodiments, the charger and SMC may operate in a master-slave or slave-master configuration without departing from the invention.

Buck converter 108 can be any type of buck converter implemented in any technology. Buck converter 108 steps the DC voltage from adapter 104 down to a DC voltage level for use by other computer system components 114 and for charging battery pack 112. Buck converter 108 includes upper switch 128 coupled to current sense resistor 110 and lower switch 130, while lower switch 130 is coupled to inductor 132 and ground. Inductor 132 is additionally coupled to capacitor 134 which is also coupled to ground, and to PBUS point 124. Upper switch 128 and lower switch 130 are controlled by and coupled to buck converter controller 122 in charger 106. Note that upper switch 128 and lower switch 130 may be implemented using any suitable transistor technology. In some embodiments buck converter 108 can be any type of converter implemented in any technology.

Battery pack 112 can be any type of battery pack capable of powering computer system 102, and can be implemented in any technology. In some embodiments, battery pack 112 includes more than one separate battery and/or battery cell. Note that other computer system components 114 represents all the other components of computer system 102 and can include but is not limited to one or more CPU cores, volatile and non-volatile memory, graphics processing chips, and any other chips, chipsets, peripherals, or other components of a computer system not otherwise depicted in FIG. 1.

Current sense resistor 110 is a resistor that is coupled at each terminal to charger 106, and can be any resistor that can be used to sense the current flowing from adapter 104. Integrator current control 118 is implemented in charger 106 using an integrator and measures the current flowing from adapter 104 using current sense resistor 110. Integrator current control 118 can be implemented in any combination of analog and/or digital technology and in some embodiments includes one or more operational amplifier and/or transistors and may have a response time of 200 micro-seconds to 2 milliseconds and an accuracy of at least 3%. Integrator current control 118 is coupled to buck converter controller 122 and can use buck converter controller 122 to control buck converter 108 to limit the current drawn from adapter 104.

Comparator current control 120 is coupled to buck converter controller 122 and can use buck converter controller 122 to control buck converter 108 to limit the current drawn from adapter 104. Comparator current control 120 can be implemented in any combination of analog and/or digital technology and in some embodiments includes a comparator that compares the current sensed across current sense resistor 110 to a current set point and generates a control signal that is sent to buck converter controller 122 to control buck converter 108 to limit the current drawn from adapter 104.

Note that the response time of comparator current control 120 is typically faster than that of integrator current control 118. Additionally, note that in some embodiments, integrator current control 118 and comparator current control 120 are operating simultaneously in charger 106. For example, if current from adapter 104 exceeds both the comparator current control 120 set point and the integrator current control 118 set point then, since comparator current control 120 has a faster response time, it will first limit the adapter current to the comparator current control 120 set point. Then after enough time has elapsed for integrator current control 118 to respond, it will limit the current from the adapter to the set point for integrator current control 118. Additionally, note that in some embodiments, integrator current control 118 may be implemented using technology other than an integrator and/or comparator current control 120 may be implemented using technology other than a comparator, as long as the response time of comparator current control 120 is faster than the response time of integrator current control 118.

Adapter ID input 116 is coupled to adapter 104 through adapter receptacle 126. Charger 106 can determine properties of adapter 104 through the connection to adapter receptacle 126 and can determine information including but not limited to the rated power output and/or adapter ID of adapter 104. Note that charger 106 may also store in a memory (not shown) adapter power ratings and/or adapter IDs associated with information about adapters that can be used with computer system 102.

Computer system 102 operates as follow. When adapter 104 is plugged into computer system 102, charger 106 reads the rated output power and/or adapter ID of adapter 104 through adapter ID input 116. Charger 106 then uses the rated output power to select (e.g., load from a memory) a thermal-limit current ($I_1$), and one or more current limits (e.g., $I_2$ and $I_3$) and associated time periods (e.g., $T_1$ and $T_2$) for each current limit for use in comparator current control 120. The selection of $I_1$, $I_2$, and $I_3$, and $T_1$ and $T_2$ will be discussed in more detail below. In some embodiments, charger 106 uses the adapter ID and/or rated output power to load one or more of the thermal-current limit, high-current limits and associated time periods, or other information related to the adapter ID from the Internet using connections (not shown) between charger 106, other computer system components 114, and the Internet.

Note that in some embodiments, currents $I_1$, $I_2$ and $I_3$ and time periods $T_1$ and $T_2$ are determined based on properties of adapter 104 including but not limited to current output characteristics, energy storage characteristics and thermal characteristic. For example, $I_3$ and $T_1$ may be selected based on the amount of energy stored by an effective output capacitance of adapter 104, while $I_2$ and $T_2$ may be selected based on energy stored in other components in adapter 104, or other performance characteristics of adapter 104 that allow a temporary increase in the output current of adapter 104 without causing thermal or other damage. Thermal-limit current $I_1$ may be determined based thermal characteristics of adapter 104 that may include but are not limited to the rated output power of adapter 104, and other thermal and performance characteristics of adapter 104 that occur over time periods longer than $T_1$ or $T_2$. Note that in one embodiment, for an 85 watt adapter, $I_1$, $I_2$ and $I_3$ may be set respectively to 4352 mA, 6016 mA and 8064 mA while $T_1$ and $T_2$ may be set respectively to 1 msec and 10 msec. Further details related to the determination of $I_1$ will be discussed below.

During operation of computer system 102, current flows from adapter 104 through current sense resistor 110 and buck converter 108 to PBUS point 124. Then, depending on the power requirements of other computer system components 114 and the state of charge of battery pack 112, some current from adapter 104 may be used by other computer system components 114 and some current may be used to charge battery pack 112.

When one or more components in other computer system components 114 increases their power consumption demands (e.g., a CPU enters a "turbo" mode), the power, and thus current required to be delivered to PBUS point 124 and then to other computer system components 114 may exceed the rated power that can be supplied in steady-state (e.g., for thermal reasons) by adapter 104.

Figure 2:
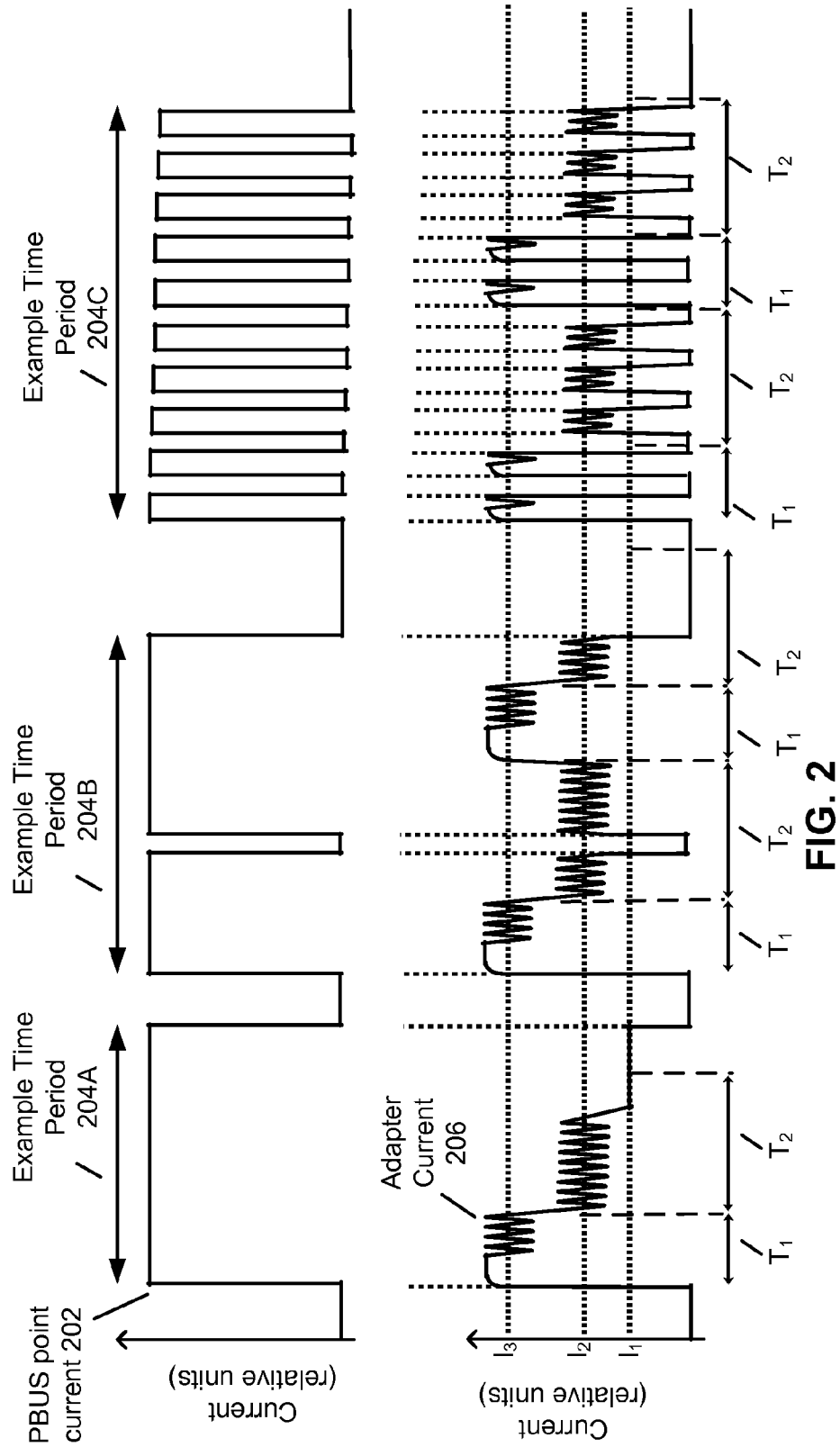
FIG. 2 depicts exemplary graphs of current drawn by a computer system and the resulting current output from an adapter in accordance with an embodiment.

Referring now to FIG. 2, the upper graph in FIG. 2 represents the current drawn by other computer system components 114 at PBUS point 124, with current in relative units on the vertical axis and time on the horizontal axis. The peaks of the upper graph represent increases of the current demand of components in other computer system components 114 (e.g., due to one or more CPU cores entering a "turbo" mode) which are above the steady-state current that can be supplied by adapter 104 due to thermal concerns. Note that the thermal concerns of the adapter may include but are not limited to adapter overheating, component degradation, including loss of voltage regulation, or thermal shut down of adapter 104 due to its own protection mechanisms.

The bottom graph of FIG. 2 represents current flowing from adapter 104 into computer system 102 in accordance with embodiments. Adapter current 206 is depicted with current in relative units on the vertical axis and time on the horizontal axis. During operation of computer system 102, charger 106 senses the current flowing from adapter 104 to PBUS point 124 using current sense resistor 110. In example time period 204A, as PBUS point current 202 rises, the current sensed by charger 106 using current sense resistor 110 rises. When the current sensed by charger 106 using current sense resistor 110 rises above $I_2$, charger 106 limits the current drawn from adapter 104 to $I_3$ using comparator current control 120.

Referring back to FIG. 1, charger 106 uses comparator current control 120 to limit the current from adapter 104 through buck converter controller 122. Buck converter controller 122 controls buck converter 108 so that when the current sensed by comparator current control 120 using current resistor 110 rises above $I_3$, comparator current control 120 controls buck converter controller 122 so that buck converter 108 opens upper switch 128 and close lower switch 130. Then when the current sensed by comparator current control 120 using current sense resistor 110 falls below $I_3$, buck converter 108 is controlled to close upper switch 128 and open lower switch 130. In this way, comparator current control 120 limits the current drawn from adapter 104 to $I_3$. Note that in some embodiments, limiting the current from adapter 104 can include but is not limited to limiting the average current from adapter 104 to a target current limit subject to the measurement accuracy and response times of comparator current control 120, while in other embodiments limiting the current from adapter 104 to a target current limit may include taking an action such as opening upper switch 128 and closing lower switch 130 when the sensed current reaches the target current, and closing upper switch 128 and opening lower switch 130 when the sensed current reaches a lower current level such as a lower target current limit, which may include the thermal limit current.

Returning to FIG. 2, charger 106 continues to limit the current from adapter 104 to $I_3$ for time period $T_1$ using comparator current control 120. (Note that when current from adapter 104 is limited, additional current may be drawn by other computer system components 114 from battery pack 112.) Then, after time period $T_1$ expires, since PBUS point current 202 is still high, the current sensed by comparator current control 120 using current sense resistor 110 will continues to exceed $I_2$ if it is not limited. Charger 106 therefore limits the current from adapter 104 to $I_2$ for a time period $T_2$ using comparator current control 120. However, before time period $T_2$ has expired, enough time has passed for integrator current control 118 to begin limiting the current from adapter 104 to $I_1$.

Returning to FIG. 2, in example time period 204B when PBUS point current 202 increases, this causes the current from adapter 104 to rise above $I_2$. Charger 106 then uses comparator current control 120 to limit the current from adapter 104 to $I_3$ for a time period $T_1$. After time period $T_1$ has expired, since PBUS point current 202 is still high, the current sensed by comparator current control 120 using current sense resistor 110 will continues to exceed $I_2$ if it is not limited. Charger 106 will then limit the current drawn from adapter 104 to $I_2$ for a time period $T_2$ using comparator current control 120. Note that at some point in example time period 204B, PBUS point current 202 drops, resulting in adapter current 206 dropping below the thermal-limit current $I_1$. Then, before time period $T_2$ has expired, PBUS point current 202 increases again resulting in the current sensed by comparator current control 120 using current sense resistor 110 to again exceed $I_2$. However, since time period $T_2$ has not expired, charger 106 continues to limit the current drawn from adapter 104 to $I_2$ using comparator current control 120. After time period $T_2$ has expired, PBUS point current 202 is still high, so charger 106 limits the current from adapter 102 to $I_3$ for time period $T_1$ using comparator current control 120. After the second $T_1$ time period expires, PBUS point current 202 is still elevated so charger 106 now limits the current from adapter 104 to $I_2$ again using comparator current control 120. Note that before the expiration of the second time period $T_2$ in example time period 204B, PBUS point current 202 drops so that the current required from adapter 104 drops below $I_1$. Additionally note that during example time period 204B, adapter current 206 did not remain high enough for long enough to cause the integrator current control 118 to begin controlling the current from adapter 104. Furthermore, note that in other embodiments in which integrator current control 118 has a faster response time, or if $I_2$ and/or $I_3$ are set higher, then integrator current control 120 may begin to limit the current from adapter 104 to $I_1$ before the end of example time period 204B.

In example time period 204C, PBUS point current 202 increases for intervals shorter than $T_1$. As a result, when PBUS point current 202 is high, charger 106 first limits the current from adapter 104 to $I_3$ for time period $T_1$ using comparator current control 120. Then after $T_1$ expires, adapter 106 limits the current from adapter 104 to $I_2$ for time period $T_2$ again using comparator current control 120. After time period $T_2$ expires, this cycle repeats itself. Note again that adapter current 206 did not remain high enough for long enough to cause integrator current control 118 to begin controlling the current from adapter 104 to limit it to $I_1$.

Figure 3:
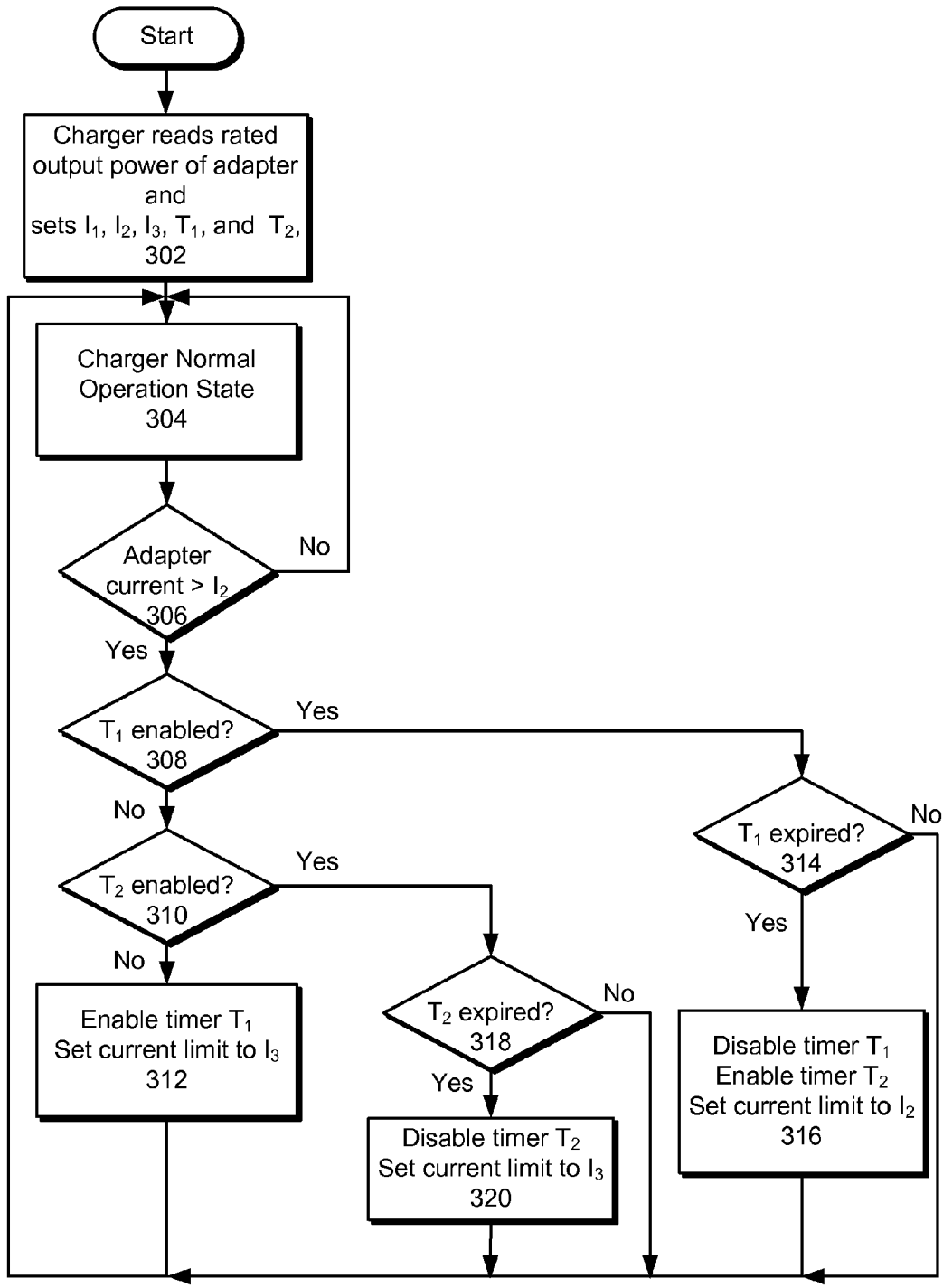
FIG. 3 shows a flowchart depicting the process for controlling the current drawn from an adapter by a computer system in accordance an embodiment.

FIG. 3 shows a flowchart depicting the process for controlling the current drawn from an adapter using a comparator current control in accordance with embodiments. First, when an adapter is plugged into the computer system, the charger reads the rated output power of the adapter and sets the thermal-limit current $I_1$, for an integrator current control and two current limits $I_2$, $I_3$, and respective time periods, $T_2$ and $T_1$, for use in a comparator current control (step 302). The charger begins normal operation (step 304). Then, if the current drawn from the adapter sensed by the comparator current control using a current sense resistor exceeds $I_2$ (step 306) the process continues to step 308 while if the sensed adapter current does not exceed $I_2$ the process return to step 304. At step 308, if timer $T_1$ is not enabled then the process continues to step 310, where if timer $T_2$ is not enable the process continues to step 312. At step 312 timer $T_1$ is enabled and the current limit for the comparator current control is set to $I_3$. The process then returns to step 304.

At step 308 if timer $T_1$ is enabled, the process continues to step 314. At step 314 if timer $T_1$ has not expired then the process returns to step 304, while if timer $T_1$ has expired the process continues to step 316. At step 316, timer $T_1$ is disabled, and timer $T_2$ is enabled and the current limit for the comparator current control is set to $I_2$. The process then returns to step 304.

At step 310 if timer $T_2$ is enabled the process continues to step 318. Then if timer $T_2$ has not expired (step 318), the process continues to step 304. If timer $T_2$ has expired (step 318), the process continues to step 320. At step 320, timer $T_2$ is disabled and the current limit for the comparator current control is set to $I_3$. The process then returns to step 304.

Figure 4:
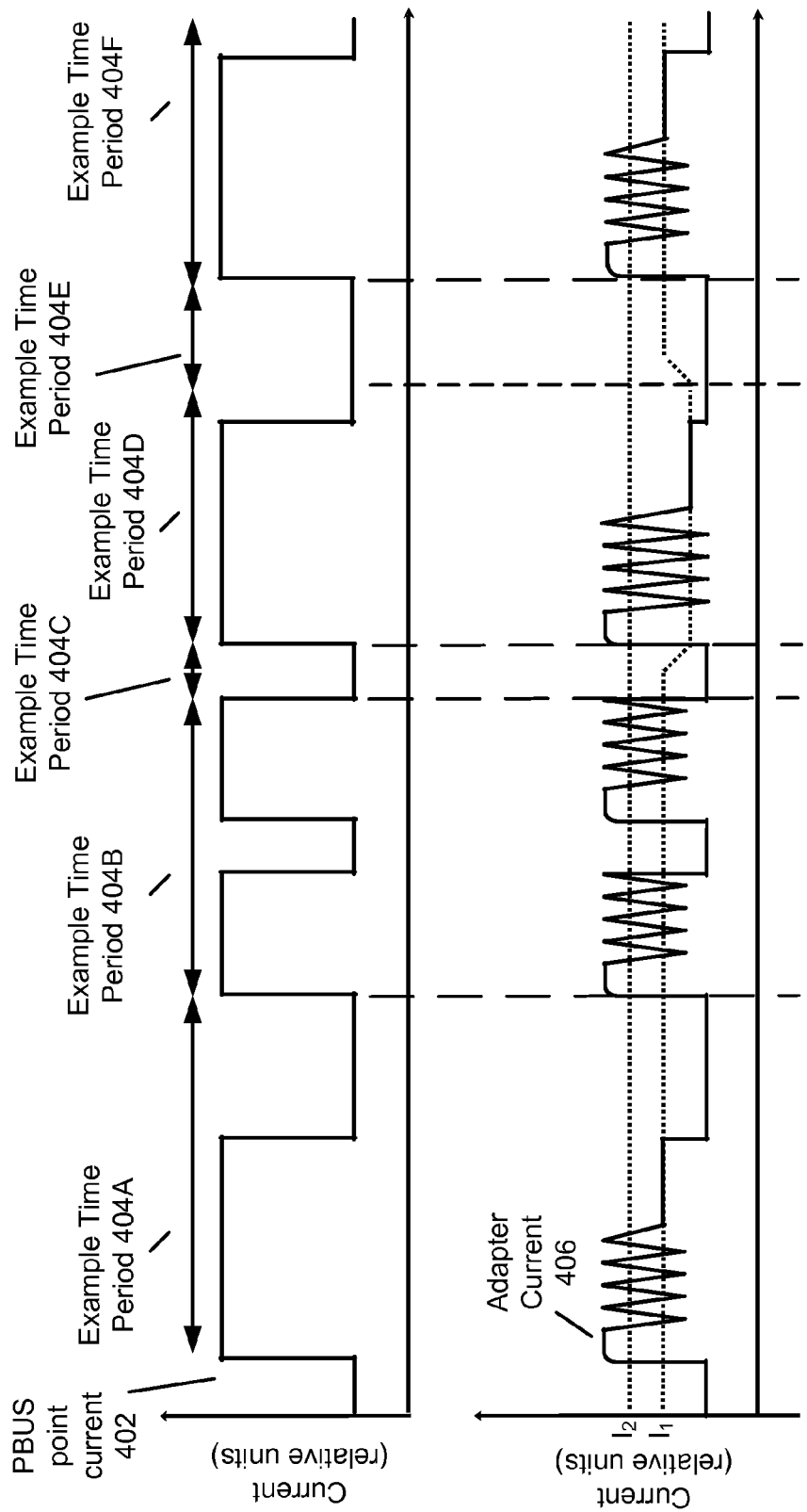
FIG. 4 depicts exemplary graphs of current drawn by a computer system, the resulting current output from an adapter and modifications to the thermal-limit current in accordance with an embodiment.

FIG. 4 depicts exemplary graphs of current drawn by a computer system, the resulting current output from an adapter and modifications to the thermal-limit current in accordance with an embodiment. The upper graph in FIG. 4 represents an exemplary graph of current drawn at PBUS point 124, with current in relative units on the vertical axis and time on the horizontal axis. The lower graph of FIG. 4 represents the current drawn from adapter 104 as PBUS point current 402 varies. As in the upper graph of FIG. 2, the peaks of the upper graph in FIG. 4 represent increases of the current demand of components in other computer system components 114 (e.g., due to one or more CPU cores entering a "turbo" mode) above the steady-state current that can be supplied by adapter 104 due to thermal concerns of adapter 104. In this embodiment, charger 106 only utilizes one current threshold ($I_2$) in comparator current control 120, and as will be discussed below, charger 106 can adjust the thermal-limit current ($I_1$).

In the present embodiment, when adapter 104 is plugged into computer system 102, charger 106 reads adapter ID input 116 and loads the thermal-limit current ($I_1$), $I_2$, a lower thermal-limit current, a higher thermal-limit current, a thermal-limit current step amount, and a predetermined thermal-limit current step time period from a memory (not shown) in charger 106.

During example time period 404A, when charger 106 senses that the current drawn from adapter 106 through current sense resistor 110 exceeds $I_1$, charger 106 uses comparator current control 120 to limit the current drawn from adapter 104 to $I_2$. Then, while PBUS point current 402 is still high, eventually enough time elapses for integrator current control 120 to begin limit the current to $I_1$ until PBUS point current 402 drops.

During example time period 404B, when comparator current control 120 senses that the current drawn from adapter 104 through current sense resistor 110 exceeds $I_1$, charger 106 limits the current drawn from adapter 104 to $I_2$ using comparator current control 120. Note that before enough time elapses for integrator current control 120 to begin limiting the current to $I_1$, PBUS point current 402 drops, causing the adapter current to fall below $I_1$. Then when comparator current control 120 again senses that the current drawn from adapter 104 through current sense resistor 110 exceeds $I_1$, charger 106 again limits the current drawn from adapter 104 to $I_2$ using comparator current control 120. Note again that before enough time elapses for integrator current control 118 to begin limiting the current to $I_1$, PBUS point current 402 drops.

Note that in example time period 404B, the current from adapter 104 was limited two times by charger 106 using comparator current control 120 without integrator current control 120 being implement in between, so charger 106 reduces the thermal-limit current ($I_1$) by the thermal-limit current step amount during example time period 404C. This reduction of the thermal-limit current allows adapter 104 to cool down after periods of increased current output. Note that in some embodiments the thermal-limit current may be decreased based on one or more factors including but not limited to the total duration of the one or more periods of increased current output, and the number of periods of increased current output within a predetermined time period. Note also that the amount by which the thermal-limit current is decrease, the thermal-limit current step amount, can be based on factors including but not limited to thermal characteristics of adapter 104, the value of currents $I_1$, $I_2$ and any other limit currents that may be being used by charger 106. Charger 106 may continue to decrease thermal-limit current $I_1$ as more periods of higher current are experience. The thermal-limit current $I_1$ may be reduced until it is equal to the lower thermal limit current, at which point charger 106 will not reduce it further.

During example time period 404D, comparator current control 120 senses that the current drawn from adapter 104 through current sense resistor 110 exceeds $I_1$. Charger 106 uses comparator current control 120 to limit the current drawn from adapter 104 to $I_2$. Then, while PBUS point current 402 is still high, eventually enough time elapses for integrator current control 118 to begin limiting the current from adapter 104 to $I_1$ until PBUS point current 402 drops. Note that during example time period 404D, $I_1$ remains at the lower current level for the predetermined thermal-limit current step time period to allow adapter 104 to cool down. Then, in example time period 404E, thermal-limit current is increased by the thermal-limit current step amount. Note that if thermal-limit current $I_1$ is below a higher thermal-limit current threshold, then charger 106 may continue to increase thermal-limit current $I_1$ as more predetermined thermal-limit current step time periods pass uninterrupted by higher adapter current 406.

Finally, in example time period 404F, when charger 106 senses that the current drawn from adapter 104 through current sense resistor 110 exceeds $I_1$, charger 106 uses comparator current control 120 to limit the current drawn from adapter 104 to $I_2$. Then, while PBUS point current 402 is still high, eventually enough time elapses for integrator current control 120 to begin limiting the current to $I_1$ until PBUS point current 402 drops.

Figure 5:
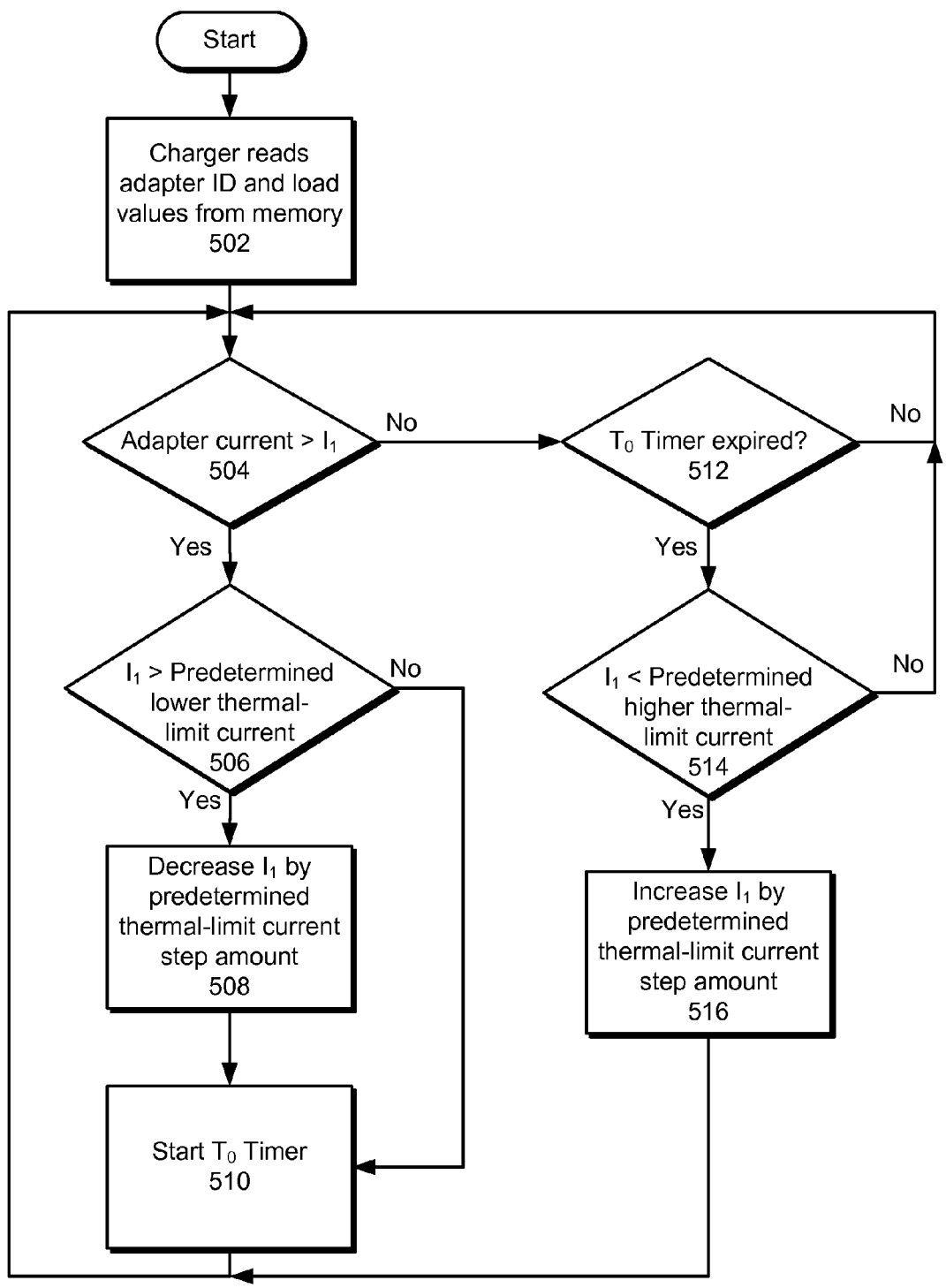
FIG. 5 shows a flowchart depicting the process for determining the thermal-limit current $I_1$ in accordance with an embodiment.

FIG. 5 shows a flowchart depicting the process for determining the thermal-limit current $I_1$ in accordance with embodiments. First, when an adapter is plugged into the computer system, the charger reads the ID of the adapter and loads the relevant values from memory based on the charger ID (step 502). The loaded values include the thermal-limit current $I_1$, $I_2$, the predetermined lower thermal-limit current, the predetermined higher thermal-current limit, the predetermined thermal-limit current step amount, and the predetermined thermal-limit current step time period ($T_0$) that the charger waits before increasing the thermal limits current.

At step 504, if the current drawn from the adapter by the computer system is exceeds $I_1$, the process continues to step 506. Note that in some embodiments, at step 504 a threshold current other than $I_1$ may be used without departing from the invention. At step 506 if $I_1$ is greater than the predetermined lower thermal-limit current, then $I_1$ is decreased by the predetermined thermal-limit current step amount (step 508), and the $T_0$ timer is started (step 510). The process then returns to step 504. At step 506 if $I_1$ is not greater than the predetermined lower thermal-limit current, then the process continues to step 510, the $T_0$ timer is started and the process returns to step 504.

At step 504 if the adapter current is not greater than $I_1$, then if the $T_0$ timer has not expired (step 512) the process returns to step 504, while if the $T_0$ timer has expired, the process continues to step 514. At step 514 if $I_1$ is not less than the predetermined higher thermal-limit current then the process returns to step 504, while if $I_1$ is less than the predetermined higher thermal limit current, $I_1$ is increased by the predetermined thermal-limit current step amount (step 516) and the process returns to step 504.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for controlling a current drawn from an adapter by a computer system, comprising:
   sensing the current drawn from the adapter using a first current sensor;
   sensing the current drawn from the adapter using a second current sensor, wherein a response time of the first current sensor is faster than a response time of the second current sensor;
   when the current sensed using the first current sensor exceeds a predetermined high-current threshold, limiting the current drawn from the adapter to a first predetermined current limit; and
   when the current sensed using the second current sensor exceeds a predetermined thermal-limit current, limiting the current drawn from the adapter to the predetermined thermal-limit current.

2. The method of claim 1, wherein limiting the current drawn from the adapter to the first predetermined current limit involves limiting the current drawn from the adapter to the first predetermined current limit for a first predetermined time period.

3. The method of claim 2, further involving:
   after the first predetermined time period, limiting the current drawn from the adapter to a second predetermined current limit for a second predetermined time period.

4. The method of claim 1, wherein the predetermined thermal-limit current is determined based on information sensed using the first current sensor.

5. The method of claim 4, wherein the information sensed using the first current sensor includes a number of times the sensed current exceeds the predetermined high-current threshold within a predetermined time period.

6. The method of claim 4, wherein when the predetermined thermal-limit current is above a predetermined lower thermal-limit current and the current sensed using the first current sensor exceeds the predetermined high-current threshold, the predetermined thermal-limit current is decreased by a predetermined amount.

7. The method of claim 4, wherein when the predetermined thermal-limit current is below a predetermined higher thermal-limit current and a predetermined time period has elapsed since the current sensed using the first current sensor last exceeded the predetermined high-current threshold, the predetermined thermal-limit current is increased by a predetermined amount.

8. The method of claim 1, wherein limiting the current drawn includes limiting the current drawn using a buck converter in the computer system.

9. The method of claim 1, wherein at least one of the predetermined high-current threshold and the predetermined thermal-limit current are determined based on a power rating of the adapter.

10. The method of claim 1, wherein the predetermined high-current threshold is equal to one of the predetermined thermal-limit current and the first predetermined current limit.

11. The method of claim 1, wherein first current sensor includes a comparator.

12. The method of claim 1, wherein second current sensor includes an integrator.

13. An apparatus that controls a current drawn from an adapter by a computer system, comprising:
   a current sense resistor;
   a first current sensor coupled to the current sense resistor, wherein the first current sensor includes a comparator, and wherein the first current sensor is configured to sense the current drawn from the adapter using the current sense resistor;
   a second current sensor coupled to the current sense resistor, wherein the second current sensor includes an integrator, and wherein the second current sensor is configured to sense the current drawn from the adapter using the current sense resistor, and wherein the first current sensor is configured to have a response time that is faster than a response time of the second current sensor; and
   a current control system coupled to the first current sensor and the second current sensor, wherein the current control system is configured so that when the current sensed by the first current sensor exceeds a predetermined high-current threshold, the current control system limits the current drawn from the adapter to a first predetermined current limit, and when the current sensed by the current control system using the second current sensor exceeds a predetermined thermal-limit current, the current control system limits the current drawn from the adapter to the predetermined thermal-limit current.

14. The apparatus of claim 13, wherein when the current control system limits the current drawn from the adapter to the first predetermined current limit, the current control system is further configured to:
   limit the current drawn from the adapter to the first predetermined current limit for a first predetermined time period.

15. The apparatus of claim 14, wherein the current control system is further configured to limit the current drawn from the adapter to a second predetermined current limit for a second predetermined time period at the end of the first predetermined time period.

16. The apparatus of claim 13, wherein the current control system is further configured to determine the predetermined thermal-limit current based on information sensed by current control system using the first current sensor.

17. The apparatus of claim 16, wherein the current control system is further configured to sense a number of times the current sensed using the first current sensor exceeds the predetermined high-current threshold within a predetermined time period and to determine the predetermined thermal-limit current based on the number.

18. The apparatus of claim 16, wherein the current control system is further configured so that when the predetermined thermal-limit current is above a predetermined lower thermal-limit current and the current sensed using the first current sensor exceeds the predetermined high-current threshold, the predetermined thermal-limit current is decreased by a predetermined amount.

19. The apparatus of claim 16, wherein the current control system is further configured so that when the predetermined thermal-limit current is below a predetermined higher thermal-limit current and a predetermined time period has elapsed since the current sensed using the first current sensor last exceeded the predetermined high-current threshold, the predetermined thermal-limit current is increased by a predetermined amount.

20. The apparatus of claim 13, wherein the current control system further includes a buck converter and the current control system is further configured to limit the current drawn from the adapter using the buck converter.

21. The apparatus of claim 13, wherein the current control system is further configured to read a power rating of the adapter and to determine at least one of the predetermined high-current threshold and the predetermined thermal-limit current based on the power rating of the adapter.

22. The apparatus of claim 13, wherein the current control system is further configured so that the predetermined high-current threshold is equal one of the predetermined thermal-limit current, and the first predetermined current limit.

* * * * *